UNITED STATES PATENT OFFICE 2,238,901

DERIVATIVES OF AMIDES OF POLYCARBOXYLIC ACIDS

Morris Katzman and Benjamin R. Harris, Chicago, Ill., assignors to The Emulsol Corporation, Chicago, Ill., a corporation of Illinois No Drawing. Application February 8, 1939,
Serial No. 255,220

18 Claims. (Cl. 260—401)

This invention relates to new chemical compounds in the form of amide derivatives of polycarboxylic acid derivatives and to intermediates which are utilized in the preparation of the final products. The compounds of the present invention, which are preferably employed in the form of reaction mixtures, are characterized by interface modifying or capillary properties whereby the same are highly useful for the various purposes described hereinafter.

At least most of the novel compounds of the present invention may be described, in general, as amides of alcohol amines, especially water-soluble amides, with polycarboxylic acids wherein the hydrogen of one or more hydroxy groups of the alcohol amine radical or radicals is replaced preferably by a higher molecular weight lipophile group, and the hydrogen of one or more hydroxy groups of the alcohol amine radical or radicals is replaced by a relatively strong hydrophile or polar group.

In general, the preferred compounds are those which comprise higher molecular weight fatty acid esters of the amides of the alcohol amines with polycarboxylic acids and wherein at least one hydrophile or polar oxygenated sulphur or oxygenated phosphorus group has been introduced into the molecule.

Many of the compounds falling within the scope of the present invention may be represented by the general formula $X.(Y)_m.(Z)_n.(A)_t$ wherein $X$ is the residue of a polycarboxylic acid, $Y$ is an alcohol primary or secondary amine radical, preferably at least two carboxyl groups of the polycarboxylic acid being amidified by the alcohol amine, $Z$ is a lipophile radical containing at least six and preferably from ten to eighteen carbon atoms, and $A$ is a hydrophile or water-solubilizing polar group. In accordance with said formula, $m$ is one or more but particularly at least 2, and each of $n$ and $t$ are at least one. The intermediate compounds are also represented by said general formula. Thus, for example, if $n$ is zero, the intermediate compound comprises a polar derivative of the polycarboxylic acid amide whereas, if $t$ is zero, the intermediate compound is a lipophile derivative of the polycarboxylic acid amide.

In view of the fact that the products of the present invention not infrequently comprise mixtures of different chemical compounds and since the products may, in many instances, be employed as such without any purification treatments, we prefer, in certain cases, to describe them as reaction products. Indeed, in certain instances, they may best be defined in such manner. In general, they may be characterized as lipophile derivatives of polar derivatives of amides of polycarboxylic acids with primary or secondary alcohol amines.

In order that the nature of the invention may become apparent, there are listed hereinbelow representative compounds which fall within the scope of the invention:

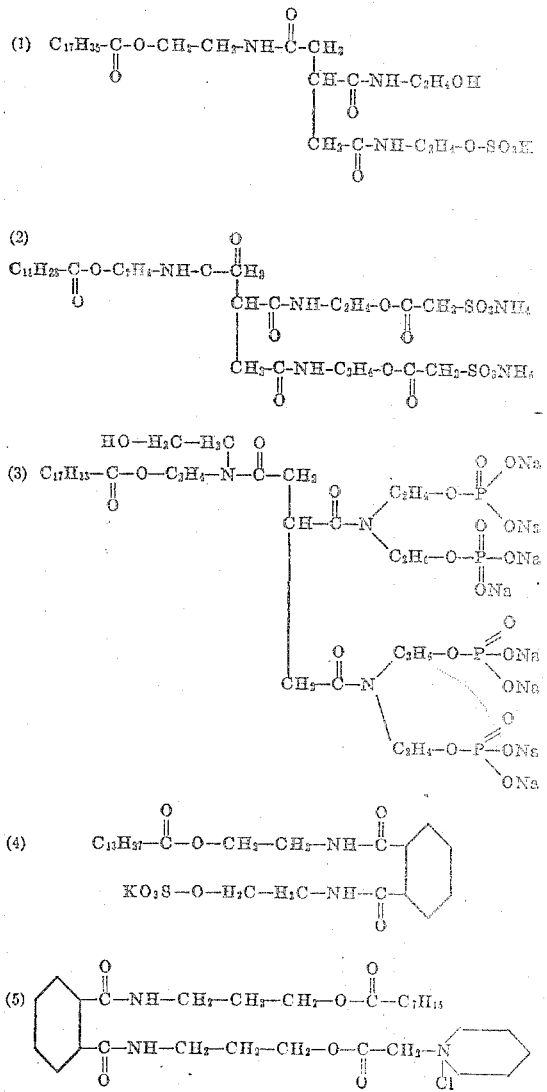

(27) 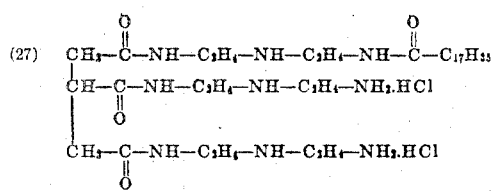

(28) 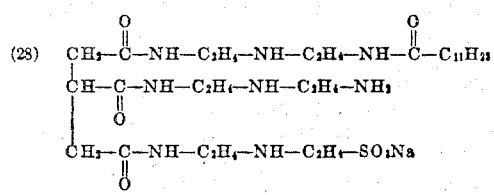

(29) 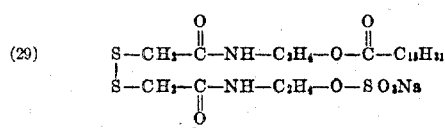

(30) 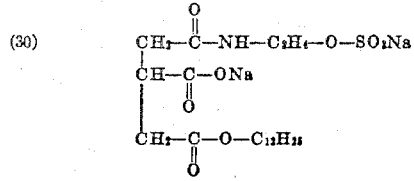

(31) 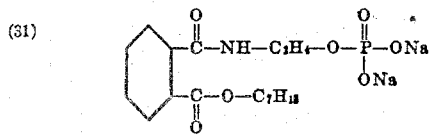

(32) 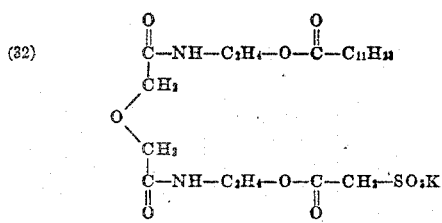

(33) 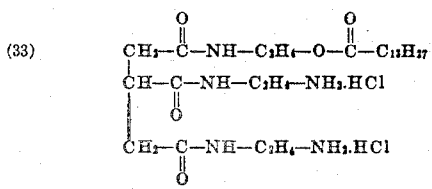

While the above examples represent single substances, it will be understood that, in practice, it is, in general, more advantageous to employ mixtures of any two or more thereof with or without diluents. In many instances, the reaction products may be employed as such.

It will be seen, in the light of the numerous examples set forth hereinabove, that many of the compounds may be considered as water-soluble or water-dispersible amides of polycarboxylic acids which are reacted to introduce at least one lipophile group, by means of a higher molecular weight alcohol, acid, acyl halide, anhydride, ester or the like, and, in certain cases, also a water-solubilizing polar group. In general, the lipophile and polar groups are introduced at extremities of the intermediate polycarboxylic acid amide.

The following examples are illustrative of methods which have been found suitable for preparing various of the compounds which are disclosed herein. It will be appreciated that other methods may be utilized, that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

Example A (a) 52 grams of triethyltricarballylate and 37.5 grams of monoethanolamine were heated for about 3 hours at a temperature ranging from 100 degrees C. to 175 degrees C. until the loss in weight and loss in alkalinity indicated that the reaction was substantially completed. The resulting reaction product was a buff-colored solid which solidified at a temperature of about 135 degrees C. to 150 degrees C.

(b) To the reaction product obtained in part (a) 30 grams of lauric acid were added and the mixture was then heated for one hour at a temperature of 220 degrees C. to 235 degrees C. until the content of free fatty acids was very low. The product obtained was a reddish liquid when hot which solidified into a reddish brown solid. The color of the reaction product may be improved by carrying out the reaction in the absence of air or in an inert atmosphere. The reaction product exhibited foaming and wetting properties. It contained a substantial proportion of a compound having the formula:

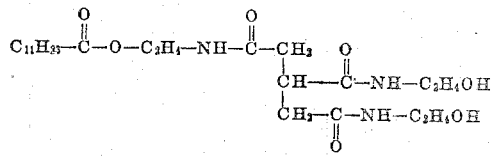

(c) 15 grams of the reaction product of part (b) hereof and 15 grams of sulpho-acetic acid were warmed to 90 degrees C. for between 5 and 10 minutes on a water bath and mixed well. The reaction product was a red, sticky, clear jelly which dissolved clearly in water and showed excellent foaming properties.

The product thus obtained was then hydrated with crushed ice and neutralized to litmus with sodium hydroxide. The final product contained a substantial proportion of mixtures of compounds having the following formulae:

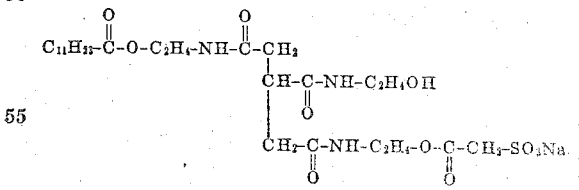

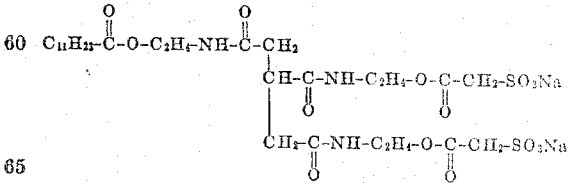

Example B (a) 20 grams of the reaction product produced in part (b) of Example A hereinabove were dissolved in about 60 grams of ethylene dichloride and the mass was centrifuged in order to obtain a clear solution containing substantially only the ester-amide.

(b) 34 cc. of the clear solution obtained in part (a) of this example were cooled to 5 degrees C. and there was added thereto dropwise, with stirring, 6.5 cc. of chlor-sulphonic acid. After the reaction was completed, ammonia gas was passed through the reaction product until the latter gave no test for free acid. The ethylene dichloride was then evaporated and a tan-colored solid was obtained which dissolved clearly in water and exhibited foaming and wetting properties. The reaction product contained a substantial proportion of a compound having the following formula

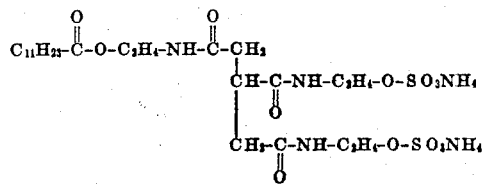

(c) In order to prepare the mono sulphuric acid ester instead of the disulphuric acid ester, the reaction may be carried out in the same way as described in part (b) of the present example, employing, however, 3.5 cc. of chlor-sulphonic acid instead of 6.5 cc. The reaction is otherwise conducted in the same manner. The final product, after evaporation of the solvent, is a tan-colored solid which dissolves clearly in water and exhibits surface modifying properties.

*Example C*

(a) 5 grams of the product produced in part (b) of Example A were purified by dissolving the same in ethylene dichloride, centrifuging and then evaporating off the solvent. The resulting purified product was dissolved in 5 grams of pyridine. To the resulting solution, maintained in an ice bath, 1.9 grams of chlor acetyl chloride were added dropwise, with stirring, the mass was then warmed to 40 degrees C. for a few hours and was allowed to stand overnight at room temperature. The reaction is complete when all of the chlorine is found in ionizable form. The reaction mass was washed with petroleum ether to remove excess pyridine. The residue was a brown solid, showed good foaming properties and contained a substantial proportion of a compound having the formula

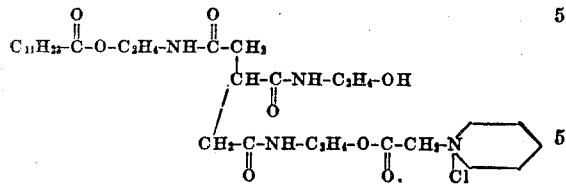

(b) By doubling the quantity of pyridine and chloracetylchloride employed in part (a) of the present example, the di-quaternary ammonium derivative may be produced having the following formula

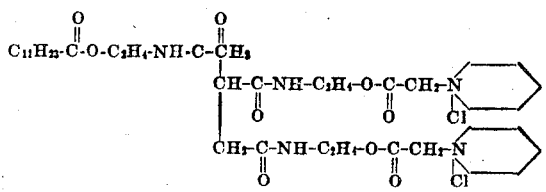

*Example D*

(a) 3 grams of the purified product resulting from part (b) of Example A hereinabove and 3.5 grams of pyrophosphoric acid were heated to 90 degrees C. and mixed well for several minutes. The reaction product was then hydrated with 10 grams of crushed ice and neutralized to litmus with a sodium hydroxide solution. The resulting product had good surface modifying properties and comprised the sodium salt of the pyrophosphoric acid ester of the ester-amide whose formula is shown hereinabove in part (b) of Example A.

(b) To produce reaction products of tetraphosphoric acid, 6.9 grams of tetraphosphoric acid may be substituted for the 3.5 grams of pyrophosphoric acid of part (a) and the reaction carried out as described. The final product had the same general desirable properties as described in part (a) hereof.

*Example E*

(a) 52 grams of triethyltricarballylate and 73 grams of diethanolamine were heated for about one hour at a temperature of from 120 degrees C. to 190 degrees C. until there was approximately a 28 gram loss in weight and the alkalinity was reduced to a very low degree. The product thus obtained was a semi-viscous liquid at 150 degrees C., was water soluble and possessed a relatively sweet taste. At room temperature, the product solidified into a wine-red, resin-like material.

(b) The reaction product of part (a) hereof was warmed up and 44 grams of lauroyl chloride were added thereto. The reaction mixture was warmed to 50 degrees C. to 60 degrees C. with vigorous stirring until no more hydrochloric acid was evolved.

(c) 10 grams of the reaction product of part (b) hereof and 10 grams of concentrated sulphuric acid were mixed at about 30 degrees C. for about 20 to 30 minutes until the mass became homogeneous. 50 grams of crushed ice were then added and the product was neutralized with a 25% solution of potassium hydroxide until the mass was neutral to litmus.

The final reaction product, which exhibited good surface modifying properties, contained a substantial proportion of a compound having the probable formula:

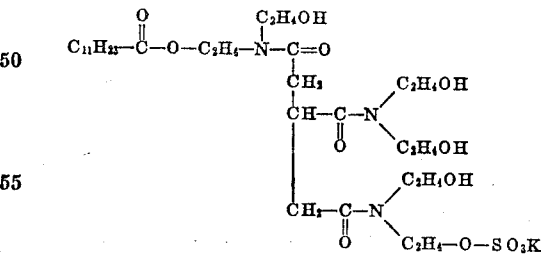

*Example F*

(a) 38.8 grams of dimethyl phthalate and 25.2 grams of monoethanolamine were heated together for about 45 minutes at 160 degrees C. to 190 degrees C. The substantial completion of the reaction is evidenced by measuring the loss of weight due to evolution of ethyl alcohol and by determining the titratable alkalinity. The reaction product obtained was an amber, resin-like material at room temperature and was freely water soluble.

(b) To the reaction product obtained in part (a) hereof 35 grams of lauric acid were added and the reaction mixture was heated for one hour at a temperature of 180 degrees C. to 220 degrees C. while passing a stream of carbon dioxide gas through the mixture. When the free fatty acids present were about 1% or less, the reaction was considered complete.

(c) Equal parts by weight of the reaction product of part (b) hereof and concentrated sulphuric acid were mixed together and, after about 20 minutes, the resulting mass was hydrated with crushed ice and neutralized to litmus with a solution of sodium hydroxide. The final product had good surface modifying properties and contained a substantial proportion of a compound having the formula:

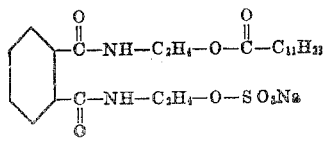

(d) In order to make a phosphoric acid ester instead of the sulphuric acid ester as described in part (c) hereof, 4 grams of the reaction product produced in part (b) of this example were mixed with 7 grams of tetraphosphoric acid and the mixture was heated, with agitation, at 90 degrees C. for several minutes. The reaction mass was then hydrated with crushed ice and neutralized with a solution of sodium hydroxide. The final product was water-soluble, had good foaming properties and was stable in hard water.

*Example G*

20 grams of the ester-amide produced in part (b) of Example F were dissolved in 20 cc. of pyridine and there were added to the resulting solution, with stirring and cooling in an ice water bath, 6.2 grams of chlor acetyl chloride. The resulting mass was warmed to 40 degrees C. to 50 degrees C. for 3 hours and was then allowed to stand at room temperature overnight. The product was then washed several times with petroleum ether to remove excess pyridine. The residue was then dried in vacuo. It was a brown, nearly solid paste, dissolved clearly in water, and had good foaming, detergent and wetting properties. The reaction mass contained a substantial proportion of a compound having the formula

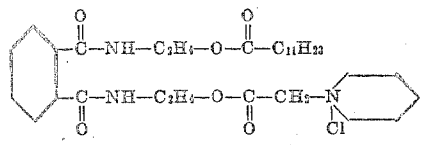

*Example H*

(a) 49.4 grams of monoethanolamine were added slowly, at room temperature and with stirring, to 58.6 grams of the diethyl ester of oxalic acid. After the addition of the monoethanolamine was completed, the mixture was heated to 170 degrees C. to complete the reaction. The reaction product was an ivory-colored, crystalline-like substance having a high melting point.

(b) 53.7 grams of the reaction product of part (a) hereof and 50 grams of lauric acid were heated together for about one hour at 170 degrees C. to 230 degrees C. at the end of which time the free fatty acids were reduced below 1%.

(c) 20 grams of the reaction product of part (b) hereof were mixed with 20 grams of sulphoacetic acid and the mixture was warmed together at 90 degrees C. for several minutes. The reaction product was a clear brown liquid. It was then hydrated with crushed ice and neutralized with a solution of sodium hydroxide. The final product contained a substantial portion of a compound having the formula

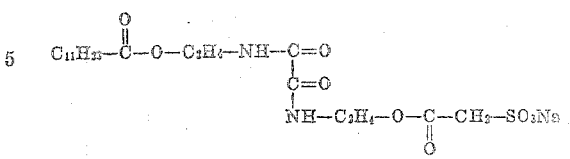

(d) In order to prepare the sulphuric acid ester instead of the sulpho-acetic acid ester as described in part (c) hereof, 20 grams of the reaction product of part (b) hereof were mixed with 30 grams of concentrated sulphuric acid at a temperature of 30 degrees C. to 40 degrees C. for several minutes. The reaction product was then hydrated and neutralized with a solution of sodium hydroxide as described in part (c) hereof.

*Example I*

(a) 14 grams of the product produced in part (a) of Example H hereinabove were dissolved in 65 cc. of pyridine and there were added thereto slowly, while cooling and stirring, 9.5 grams of lauroyl chloride. After the addition of the lauroyl chloride had been completed, the mass was allowed to stand for 30 minutes at 40 degrees C.

(b) The reaction product of part (a) hereof was then cooled to 10 degrees C. and 11.3 grams of chlor acetyl chloride were added dropwise thereto. The product was then warmed to 40 degrees C. to 50 degrees C. for 3 to 4 hours and allowed to stand until the reaction was substantially completed. The final reaction product was then washed twice with petroleum ether to remove excess pyridine and the residue was a brown-colored nearly solid paste which dissolved clearly in water, and exhibited foaming and other surface modifying properties. The reaction mass contained a substantial proportion of a product having the formula:

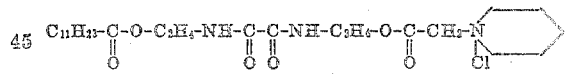

Instead of reacting the amide of the alcohol amine and the polycarboxylic acid first with the higher fatty acid or the like and then with sulphuric acid or other hydrophile material, the sulphuric acid group or other hydrophile group may be initially introduced into the amide and then the lipophile group may be introduced by reaction with a higher fatty acid, acyl halide or other derivative.

The polycarboxylic acids from which the amides are derived or prepared or from the esters of which the amides are prepared may be selected from a large group including aliphatic, cycloaliphatic, aromatic, araliphatic, and hydroaromatic, saturated and unsaturated, among which may be mentioned oxalic acid, malonic acid, succinic acid, glutaric acid, adipic acid, pimelic acid, suberic acid, azelaic acid, sebacic acid, brassilic acid, methylene malonic acid, alkylidine malonic acid, maleic acid, fumaric acid, citraconic acid, mesaconic acid, itaconic acid, dimethyl maleic acid, ethyl maleic acid, methyl ethyl maleic acid, glutaconic acid, muconic acid, acetylene dicarboxylic acid, tartronic acid, malic acid, citra malic acid, tartaric acid, dihydroxy tartaric acid, tetrahydroxy adipic acid, aconitic acid, hydroxy methyl succinic acid, mucic acid, saccharic acid, the mono- and polyhydroxy derivatives of pimelic, suberic, azelaic and sebacic acids, and the like and substitution derivatives thereof. These acids may be used as such or in the form of their acyl halides, anhydrides or esters, namely, the lower molecular weight esters such as the methyl and ethyl esters thereof or in other forms suitable for amidification. While the free acids may be employed for reaction with the alcohol primary or secondary amines to produce the amides thereof, it is preferred to utilize the ethyl or methyl esters of the polycarboxylic acids in the reaction with the alcohol primary or secondary amines since lower reaction temperatures may be employed with resultant better color of the intermediate amide products. In certain cases, the polycarboxylic acids or the esters thereof also contain other substituents such as CN, $NH_2$, $NO_2$, F, Cl, Br, I, $SO_3H$, SCN, phosphate, sulphate, etc. It is preferred to employ dicarboxylic acids in the form of their ethyl esters.

The alcohol primary and secondary amines or alkylolamines which are reacted with the polycarboxylic acid or derivatives thereof to produce the intermediate amides include, among others, by way of example, monoethanolamine, diethanolamine, monopropanolamine, dipropanolamine, monobutanolamine,

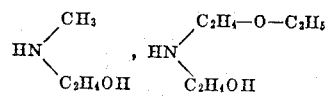

monocyclohexyl, β-hydroxyethyl amine; monobutyl, β-hydroxyethyl amine; N-β-hydroxylethyl aniline; 1-amino-propanediol-2,3; sorbitol monoamine, $H_2N-C_2H_4-S-C_2H_4OH$, $H_2N-C_2H_4-O-C_2H_4OH$, $H_2N-C_2H_4-NH-C_2H_4OH$,

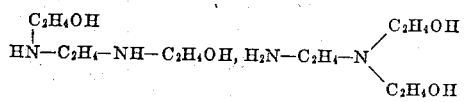

monoethyl monoethanolamine, and the like.

The lipophile group or groups which are introduced into the molecule may be derived from various sources among which may be mentioned, by way of example, straight chain and branched chain higher molecular weight carboxylic, aliphatic and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid; hydroxy benzoic and naphthoic acids, and the like; polymerized fatty acids; acyloxy carboxylic acids such as

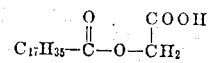

and the like; and substitution and addition derivatives, particularly halogen substitution and addition derivatives of the aforementioned carboxylic substances. It will be understood that mixtures of any two or more of said acids may be employed if desired. The higher fatty acids may be utilized as such or in the form of derivatives thereof such as carboxylic acyl halides, esters and the like.

In those cases where higher molecular weight ethers of the amides of the polycarboxylic acids are prepared, the higher molecular weight organic radical may be derived from alcoholates from alcohols corresponding to the higher molecular weight acids referred to hereinabove.

The water-solubilizing polar or hydrophile groups which are introduced into the compound may be derived from a large class and include such groups as, for example, sulphates, sulphonates, phosphates including orthophosphates, metaphosphates, pyrophosphates, tetraphosphates, and mixtures thereof, sulpho-carboxylic groups such as sulphoacetates, sulpho-propionates, sulpho-succinates, and the like, borates, nitrogenous groups including quaternary ammonium, sulphonium and phosphonium radicals, and other water-solubilizing polar groups. It will be understood that the term "quaternary ammonium radical" is intended to cover one containing a pentavalent nitrogen wherein four valences are satisfied by carbon and the fifth valence by an anion such as halogen, hydroxy, nitrate, acetate, or the like.

The reaction products may be used as such or they may be neutralized, in whole or in part, with suitable anti-acid materials, or they may be internally neutralized as in Example 25 hereinabove. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol-amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl monoethanolamine, 1-amino-2, 3-propanediol, 1,2-diaminopropanol; alkylamines such as ethylamine, propylamine, laurylamine, cetylamine, butylamine, hexylamine, cyclohexylamine, aniline, toluidines, dimethylamine, diethylamine, N-methyl-N-ethyl amine, triethylamine, trimethylamine, ethylene diamine, diethylene triamine, triethylene tetra-amine, betaine, monomethyl ethylene diamine, monoethyl diethylene tetra-amine, mono-allyl amine, hydrazine and substituted hydrazine; aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cycloalkyl groups and the like; quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl trimethyl ammonium hydroxide; mixtures of any two or more of said bases as, for example, in the case of commercial triethanolamine which contains minor proportions of mono- and diethanolamine; proteins and partial digestion or hydrolysis products thereof. It will be understood that these substituted ammonium compounds or organic nitrogenous bases may be utilized in pure, impure, or commercial form.

It will be understood that by the term "cation," as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

It will be understood that the term "lipophile group," as used herein, includes groups having a definite affinity for oils and fats and comprises, for example, alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

In contra-distinction thereto, the term "hydrophile group" or "hydrophilic group" or "water-solubilizing polar group" includes groups which possess an affinity for water and aqueous media and which, in the instant case, include, among others, those listed hereinabove.

The compounds of our invention have utility in various arts in which interface modifying agents are employed. Many of them are resistant to precipitation by calcium and magnesium salts and are compatible with acid and alkali media. They may be utilized in washing and laundering and in the textile and related industries wherein they function for wetting, lathering, detergent, emulsifying, penetrating, softening, finishing, dispersing, frothing and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial silk fabrics and silk and wool substitutes. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purpose. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents of our invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore-dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. Many of them may also be used with effect in the preparation of metal and furniture polishes, shoe polishes, in rubber compositions, for breaking or demulsifying petroleum emulsions such as those of the water-in-oil type which are encountered in oil-field operations, and with advantage in place of lecithin in chocolate and other confections so far as the innocuous compounds are concerned, as well as in paints and the like, and for various other purposes which will readily occur to those versed in the art in the light of my disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulpho-acetate, and the like; sulphuric and sulphonic derivatives of condensation products of alkylolamines and higher fatty acids; reaction products of phosphoric, pyrophosphoric, metaphosphoric, tetra-phosphoric, and polyphosphoric acids with higher molecular weight alcohols; Turkey red oils; compounds of the type of isopropyl naphthalene sodium sulphonate, and other classes of wetting agents.

It will be understood that the compounds need not be utilized in the pure state. Indeed, in most instances it will be found to be more convenient and commercially desirable to employ them in the form of their reaction mixtures with or without the addition of diluents. It will also be understood that mixtures of any one or more of the reacting constituents may be employed in producing the products hereof and this is particularly the case where commercial supplies of the chemicals are utilized.

The term "higher," as used herein and in the claims to describe carboxylic and fatty acids, alcohols, and the like, will be understood to mean at least six carbon atoms unless otherwise specifically stated.

The term "poly" wherever used herein will be understood to be employed in its usual sense, namely, to denote two or more.

The term "residue," as used throughout the specification and claims, is employed in its ordinarily understood chemical significance. For example, where one carboxyl group of tricarballylic acid is amidified with monoethanolamine and another carboxyl group is esterified with an alcohol, that which remains of the tricarballylic acid molecule, for example

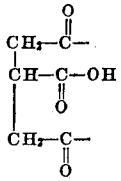

is the residue of the polycarboxylic acid, in this case tricarballylic acid.

What we claim as new and desire to protect by Letters Patent of the United States is:

1. A process of preparing surface modifying agents which comprises providing an amide of a polycarboxylic acid wherein at least two different carboxyl groups of the polycarboxylic acid are amidified, and then introducing into one of the amide groups of the amide molecule a lipophile group containing at least six carbon atoms and into another amide group of the amide molecule a water-solubilizing polar group.

2. A process of preparing surface modifying agents which comprises providing an amide of a polycarboxylic acid wherein at least two different carboxyl groups of the polycarboxylic acid are amidified by an alcohol amine, and then esterifying said amide with a member selected from the group consisting of carboxylic acids containing at least six carbon atoms and their esters, anhydrides and acyl halides, and replacing the hydrogen of at least one hydroxyl group of said amide with a water-solubilizing polar group.

3. A process of preparing surface modifying agents which comprises reacting monoethanolamine with an alcohol ester of a polycarboxylic acid whereby amides are produced in which at least two carboxyl groups of the polycarboxylic acid are amidified, then introducing into different amide groups of the molecule of said amides a water-solubilizing polar group and a fatty acid acyl group containing from ten to eighteen carbon atoms.

4. Higher molecular weight fatty acid esters of polar derivatives of amides of polycarboxylic acids with monoethanolamine, at least two carboxyl groups of the polycarboxylic acid being amidified, and the higher molecular weight fatty acid radical and the polar radical being introduced into different amide groups of the polycarboxylic acid amide.

5. Higher molecular weight fatty acid esters of polar derivatives of amides of phthalic acid with monoethanolamine, the two carboxyl groups of the phthalic acid being amidified, and the higher molecular weight fatty acid radical being introduced into one of said amide groups and the polar radical into the other of said amide groups of the phthalic acid amide.

6. Higher molecular weight fatty acid esters of polar derivatives of amides of tricarballylic acid with monoethanolamine, at least two carboxyl groups of the tricarballylic acid being amidified, and the higher molecular weight fatty acid radical and the polar radical being introduced into different amide groups of the tricarballylic acid amide.

7. Chemical compounds in accordance with the general formula

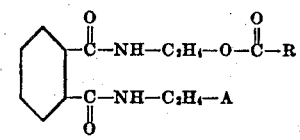

wherein

is a carboxylic acyl radical containing at least six carbon atoms, and A is a water-solubilizing polar group.

8. Chemical compounds in accordance with the general formula

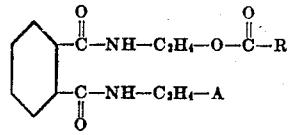

wherein

is an aliphatic carboxylic acyl radical containing from ten to eighteen carbon atoms, and A is a water-solubilizing polar group.

9. Higher molecular weight amides of water-solubilizing polar derivatives of water soluble amides of polycarboxylic acids with polyamines, at least two carboxyl groups of the polycarboxylic acid being amidified, and the higher molecular weight radical and the water-solubilizing polar radical being attached to different amide groups of the polycarboxylic acid amides.

10. A process of preparing surface modifying agents which comprises reacting a member selected from the group consisting of alcohol primary and secondary amines with a member selected from the group consisting of polycarboxylic acids and esters thereof with alcohols, whereby an amide is produced in which at least two carboxyl groups of the polycarboxylic acid are amidified, then introducing into different amide groups of the molecule of said amides a water-solubilizing polar group and a lipophile group containing at least six carbon atoms.

11. A process of preparing surface modifying agents which comprises reacting a member selected from the group consisting of alkylol primary and secondary amines with an ethyl ester of a polycarboxylic acid, whereby an amide is produced in which at least two carboxyl groups of the polycarboxylic acid are amidified, then introducing into different amide groups of the molecule of said amides a water-solubilizing polar group and a carboxylic acyl group containing from ten to eighteen carbon atoms.

12. The class consisting of higher molecular weight ethers and esters of polar derivatives of amides of polycarboxylic acids with a member selected from the group consisting of alcohol primary and secondary amines, at least two carboxyl groups of the polycarboxylic acid being amidified, and the polar group and the higher molecular weight ether or ester groups being introduced into different amide groups of the polycarboxylic acid amides.

13. Hydrophylic higher molecular weight aliphatic carboxylic acid esters of the group consisting of oxygenated sulphur and oxygenated phosphorus polar derivatives of amides of polycarboxylic acids with a member selected from the group consisting of alcohol primary and secondary amines, at least two carboxyl groups of the polycarboxylic acid being amidified, and the higher molecular weight aliphatic carboxylic acid radical and the oxygenated sulphur or oxygenated phosphorus polar group being introduced into different amide groups of the polycarboxylic acid amides.

14. Higher molecular weight carboxylic acid esters of sulphuric derivatives of amides of polycarboxylic acids with a member selected from the group consisting of alkylol primary and secondary amines, at least two carboxyl groups of the polycarboxylic acid being amidified, and the higher molecular weight carboxylic acid radical and the sulphuric radical being introduced into different amide groups of the polycarboxylic acid amides.

15. Higher molecular weight fatty acid esters of amides of polycarboxylic acids with a member selected from the group consisting of alcohol primary and secondary amines, the fatty acid radical being ester-linked at an hydroxy group of the alcohol amine.

16. Chemical compounds in accordance with the general formula $X.(Y)_m.(Z)_n.(A)_t$ wherein $X$ is the residue of a polycarboxylic acid, $Y$ is the radical of a member selected from the group consisting of alcohol primary and secondary amines, at least two of the carboxyl groups of the polycarboxylic acid being amidified by the alcohol amine, $Z$ is a lipophile group containing at least six carbon atoms, $A$ is a water-solubilizing polar group, and $m$, $n$ and $t$ are each at least one, $Z$ and $A$ being attached to different amide groups of the polycarboxylic acid amide.

17. Chemical compounds in accordance with the general formula $X.(Y)_m.(Z)_n.(A)_t$ wherein $X$ is the residue of an aliphatic polycarboxylic acid, $Y$ is the radical of a member selected from the group consisting of alcohol primary and secondary amines, at least two of the carboxyl groups of the polycarboxylic acid being amidified by the alkylolamine, $Z$ is a fatty acid acyl group containing at least six carbon atoms, $A$ is a water-solubilizing oxygenated sulphur polar group, $m$ is at least two, and $n$ and $t$ are each at least one, $Z$ and $A$ being attached to different amide groups of the polycarboxylic acid amides.

18. Lipophile derivatives of water-solubilizing polar derivatives of water-soluble amides of polycarboxylic acids, at least two carboxyl groups of the polycarboxylic acid being amidified, and the lipophile radical and the polar radical being attached to different amide groups of the polycarboxylic acid amide.

MORRIS KATZMAN.
BENJAMIN R. HARRIS.